Sept. 13, 1966  R. A. ROSSMEISL  3,273,033
MULTIDIELECTRIC THIN FILM CAPACITORS
Filed Aug. 29, 1963
Fig. 1
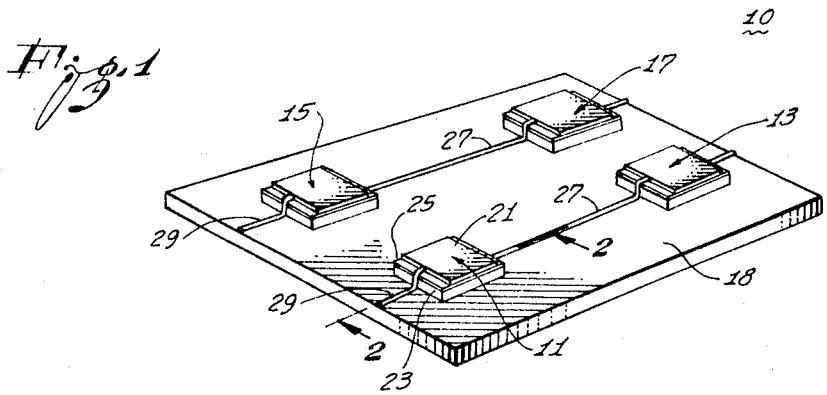
Fig. 2
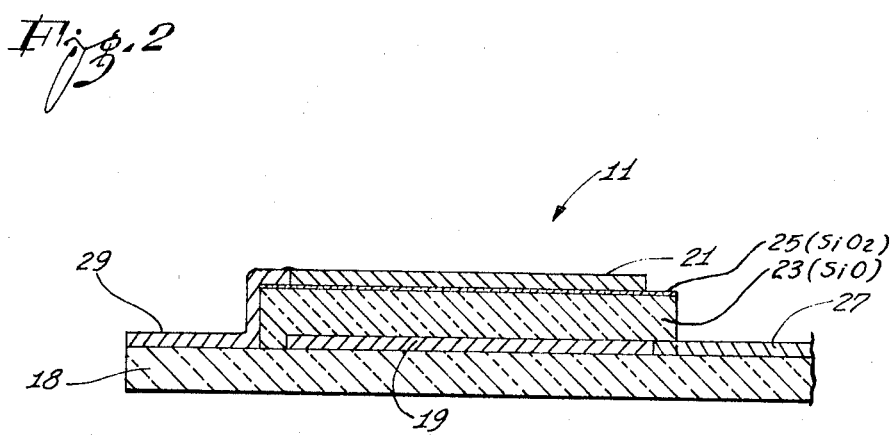
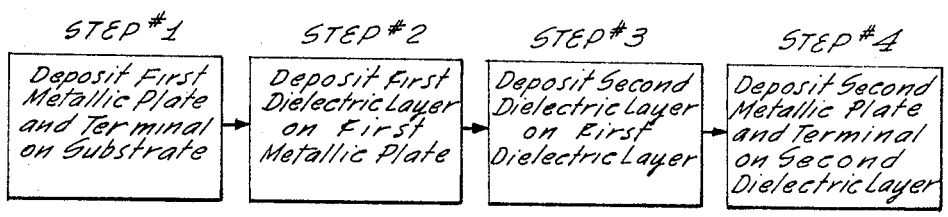
Fig. 3
INVENTOR:
Richard A. Rossmeisl
By [signature]
Attorney

United States Patent Office 3,273,033
Patented Sept. 13, 1966

3,273,033
MULTIDIELECTRIC THIN FILM CAPACITORS
Richard Alan Rossmeisl, Woodland Hills, Calif., assignor to Litton Systems, Inc., Woodland Hills, California
Filed Aug. 29, 1963, Ser. No. 305,352
5 Claims. (Cl. 317—258)

This invention relates to capacitors and more specifically to thin film capacitors having extremely low current leakage characteristics and to a method for fabricating such capacitors.

Precision capacitors have long been a desired end product in many fields. For example, the accuracy of an analog computer depends upon the precise capacitance values and low leakage characteristics of its capacitors. Precise, low leakage capacitors having substantial capacitance have been fabricated for use in conventional-size systems where dielectric layers may be thickened to reduce leakage current and plate area may be increased to increase capacitance. The fact that low leakage materials may, in general, be used in conventional-size capacitors without fabricating problems has aided the attainment of large precision capacitors. However, like characteristics have heretofore been unattainable in the area of thin film circuitry and other micro-circuitry. In fact, the design of miniaturized analog computers has been hindered for many years by the lack of capacitors displaying sufficient capacitance and low enough current leakage characteristics for use in integrating circuits and operational amplifiers; and many researchers have instead applied their abilities to devising and improving more complicated digital schemes and systems to serve in place of analog computers.

A number of problems have complicated the fabrication of thin film capacitors with the appropriate characteristics. The primary complicating factor has been the small size of the capacitors and the thinness of the film dielectrics. Because the layers are so thin, the leakage characteristics of even normally useful dielectrics are enhanced to the point where precision has heretofore been unattainable. Furthermore, the small plate size of these miniature capacitors has drastically limited the capacitance attainable with conventional dielectric materials.

New materials have been tried but their use seems only to complicate the problem. For example, the primary method of fabricating the dielectric layer of thin film capacitors is by evaporative deposition. However, dielectric materials having a sufficiently low leakage characteristic are, in general, extremely hard to deposit. Furthermore, the temperatures required for deposition of such materials are so high and necessitate the expenditure of so much power that it has been uneconomical to even attempt the process. The equipment used in accomplishing the deposition must be operated at such high temperatures that its life is shortened to the point that only one or two depositions may be practiced before the equipment fails. Even where such deposition is possible, the high temperatures and the lengths of time involved are conducive to the generation of leakage-increasing impurities, even under the most carefully controlled atmospheres.

Where attempts have been made to increase capacitance while retaining small dimensions by the use of new materials, new problems have arisen. In general, large capacitors require large plate area or a material with a high dielectric constant. Many materials having dielectric constants sufficiently high to allow reduced plate area are useless as thin film capacitor dielectrics because they display too much leakage. On the other hand, materials having low leakage characteristics in general have low dielectric constants so that capacitors formed from them must be very large in area. The problem has thus been to impart in some way low leakage properties to film dielectrics having high dielectric constants so that small size capacitors with sufficient capacitance can be fabricated.

I have now discovered a unique capacitor structure which may be fabricated as a thin film circuit element in a relatively rapid manner by processes which require substantially lower average temperatures, take a shorter processing time, and consume substantially less power. Conversely, the suggested structure will also provide thin film capacitors with high capacitance values since it allows the reduction of the leakage characteristics of capacitors having film dielectric layers with high dielectric constants. The structure which I propose includes a two-layered dielectric. The first layer of film, which is relatively thick compared to the second layer, is composed of a material having a dielectric constant appropriate to the finished capacitor. This first layer is deposited on a capacitor plate of metallic film which adheres to a substrate. The second layer of film, a thin layer of low leakage dielectric material, is then deposited onto the surface of the first dielectric layer to complete the dielectric region. Finally, the second film plate is deposited over the second layer of dielectric material.

On examination it will be found that such a capacitor, fabricated with selected dimensions, has a dielectric constant substantially identical to that of the material of the thicker layer and a leakage characteristic substantially equal to that of the thinner layer. Furthermore, provided the thicker layer is composed of an easy-to-deposit material which deposits in a relative short time at low deposition and evaporation temperatures and the low leakage layer is so thin that it requires a relative short time to deposit, the total time of deposition is substantially less than the time normally required to deposit a single layer of the generally hard-to-deposit low leakage dielectric. Thus, the equipment used in the deposition process is operated for a substantially shorter period at lower temperatures, consumes less power, and has a substantially longer life. Furthermore, by associating a thin layer of low leakage dielectric material with a layer of dielectric material having a high dielectric constant but a high leakage characteristic, small thin film capacitors with substantial capacitance may be realized.

It is therefore a primary object of this invention to provide extremely low leakage thin film capacitors.

A further object to this invention is to reduce the time and the cost required to fabricate low leakage thin film capacitors.

Another object of this invention is to improve the leakage characteritsics of thin film capacitors.

An additional object of this invention is to increase the life of the equipment used to fabricate low leakage capacitors.

Another object of this invention is to increase the capacitance of thin film capacitors.

Yet another object of this invention is to reduce the size of analog computer components and allow their use in a variety of areas heretofore restricted to digital systems.

These and other objects and features which are characteristic of the invention will be better understood from the following description considered in connection with the accompanying drawings in which an embodiment of the invention is illutsrated by way of example. It is to be expressly understood that the drawings are for the purpose of illustration and description only and are not intended as a definition of the limits of the invention.

FIGURE 1 is a perspective drawing of a thin film circuit which includes a number of low leakage capacitors fabricated according to the present invention;

FIGURE 2 is a cross section of a thin film capacitor constructed according to the present invention; and FIGURE 3 shows a time chart of the various steps in manufacturing a thin film capacitor according to the present invention.

Where the elements shown in the two views correspond, the same numerical designations are used, for the sake of convenience.

In FIGURE 1 is shown an arrangement 10 of thin film elements. The arrangement 10 includes a plurality of capacitors 11, 13, 15, and 17 selectively positioned upon one surface of a substrate 18. Each of the capacitors, for example the capacitor 11, includes a lower metallic plate 19 (shown in FIGURE 2) deposited upon the upper surface of the substrate 18, a first dielectric layer 23 located parallel to and adjoining the upper surface of the metallic plate 19, a second dielectric layer 25 located parallel to and adjoining the upper surface of the first dielectric layer 23, and an upper metallic plate located parallel to the lower plate 19 and adjoining the second dielectric layer 25. The capacitors 11, 13, 15 and 17 are variously interconnected as desired for the specific arrangement 10 which has been fabricated. For the purposes of illustration, a metallic conductor 27 is shown interconnecting the lower metallic plate 19 of the capacitor 11 with the upper metallic plate 21 of the capacitor 13 while another metallic conductor 29 is illustrated as providing an electrical connection to the lower metallic plate 21 of the capacitor 11. Such an arrangement, obviously, places the capacitors 11 and 13 in series.

FIGURE 2 illustrates a cross section of the capacitor 11 and the substrate 18 upon which it is mounted. FIGURE 2 is useful in explaining the problems encountered in fabricating thin film circuit capacitors by prior art methods. As is well known, the capacitance of a capacitor depends upon the surface area of the two plates, the separation between the two plates, and the dielectric constant of the separating materials, in the following manner:

$$C = dA/s$$

where C is capacitance, $d$ is the dielectric constant of the insulating material, A is the area of a surface of one of the two metal plates, and $s$ is the distance separating the plates. From the equation, it may be seen that a certain thickness of insulating material will be required, considering the dielectric constant of the material comprising that thickness, to separate the metallic plates in order to obtain the appropriate capacitance.

As pointed out, however, the accuracy of analog computers utilizing thin film capacitors depends to a substantial extent on the low leakage characteristics of the capacitors. If a capacitor provides a substantial leakage path for current between the plates (conducts a current greater than two nanoamperes, for example) it will be incapable of accurately storing a charge over varying selected periods of time and will thus influence the accuracy of the analog computer in which it is included as an element.

There are a number of materials which may be used as dielectrics. However, only a few of these materials when used in films of less than 10,000 angstroms (thin films) display the appropriate low leakage characteristics required for use in the above-mentioned computer applications. In general, such materials have not been used in capacitors before this time because of the difficulty of depositing such materials to form the dielectric film physically separating the two capacitor plates.

For example, aluminum oxide is very good dielectric having an extremely low leakage characteristic. However, in order to deposit a film of aluminum oxide dielectric material of 4000 angstroms, for example, by the normal evaporation-deposition technique, it is necessary to heat the aluminum oxide to a temperature of approximately 2000° C. and maintain such a heat for longer than two hours. Such a process requires a great deal of power. Moreover in order to maintain such a heat, the radiant heating elements (normally molybdenum-tantalum heaters) must remain at a temperature of approximately 3000° C. for the two hour period. At this heat the elements have a lifetime of approximately four hours so that only two depositions of dielectric may be made before new elements are required. However, at lower temperatures the lifetime of such elements may be vastly extended; for example, at 1000° C. exemplary heating elements have a lifetime of approximately eighty hours. Such a power, equipment, and time consuming process of fabricating capacitors is manifestly uneconomical.

In addition to the economics of the process, dielectric materials deposited at such high temperatures for extended periods have a tendency to pick up nitrogen or oxygen from the atmosphere of deposition. These impurities influence the leakage characteristics of the dielectric and tend to render it unsatisfactory for analog computer use. Thus, often dielectrics deposited over such long periods at such high temperatures do not in fact satisfy the basic requirements for the capacitors in which they are to be used.

I have found that by fabricating the insulating region between capacitor plates in two parallel layers of different materials the time of deposition may be substantially shortened, the power needed for the process may be reduced, the lifetime of the fabricating equipment may be extended, the purity of the insulating materials deposited may be increased, and the desired low leakage characteristics may be obtained. I have determined that a low leakage characteristic may be imparted to a capacitor by means of an extremely thin layer of low leakage dielectric material. The amount of leakage current which a block of dielectric material will conduct depends on the cross-sectional area of the block, the thickness or path length of the block, and the conductance of the material. If current passes through two blocks of dielectric materials which lie in a path between two metallic plates, then the leakage characteristic of one block will determine the leakage current transferred by the two-layer dielectric. The two layers of dielectric material between the plates are effectively in series to the leakage current, and a low leakage material may be chosen (one with a low conductivity) such that only a minimum thickness is necessary to provide the appropriate electrical isolation. By reducing the layer of hard-to-deposit dielectric material to a minimum, the high temperature deposition time may be reduced by a factor of from five to ten.

The remainder of the space between plates may then be filled by an easy-to-deposit insulating material having an appropriate dielectric constant. In general, the dielectric constant of the easy-to-deposit material determines the capacitance of the capacitor, at least where the hard-to-deposit layer is relatively thin. More specifically, since the two blocks of dielectric material, form, in effect, a series path for leakage current between the two metallic plates of the capacitor, the effective capacitance of the two-layered region is determined as though two capacitors were connected in series between the two plates. By operating on the equation for the capacitance of a pair of capacitors in series, it will be seen that as long as the thickness of the layer having the low leakage characteristic remains small relative to the thickness of the other layer, the capacitance of the region will depend substantially on the dielectric constant of the other layer. Thus, the material used in the easy-to-deposit layer should be selected to provide the appropriate capacitance.

Thus, for example, in FIGURE 2 the dielectric layer 23 is approximately seven times the thickness of the dielectric layer 25. The layer 23 may be fabricated from an easy-to-deposit insulating material such as silicon monoxide which has the appropriate dielectric constant to impart the selected capacitance to the capacitor 11. The dielectric layer 25 may then be fabricated from a hardto-deposit dielectric material with an extremely low leakage characteristic, such as quartz or aluminum oxide. Assuming a total deposition of approximately 4000 angstroms, as in the above-mentioned example, the time of deposition of the dielectric material may be reduced from approximately two hours at a temperature of 2000° C. to a combined deposition of less than one-half of one hour, approximately half of which takes place at a temperature of 1350° C. Manifestly, a reduction in processing time to one-fourth substantially reduces the power consumed by the process without any other factors being considered. However, the rapid deposition also influences the purity of the material and substantially improves the capacitor leakage characteristics.

An added advantage which may be realized from the two-layered structure relates to the capacitance obtainable. Normally, only very low capacitances are obtainable in thin film capacitors due to the high leakage properties of materials having high dielectric constants. However, with the present invention capacitances of greater than 0.06 microfarad per square inch of plate have been attained. And by forming the thicker layer from a material (such as titanium dioxide or barium titanate) having a very high dielectric constant (but normally unusable in capacitors due to its high leakage properties) and adding the leakage-reducing thin layer, a physically small capacitor with extremely large capacitance may be fabricated.

In order to better illustrate the advantages offered by the two-layer dielectric and the fabrication process, the method used in the fabrication is hereafter explained. In order to more clearly highlight the invention, a time chart of the various steps involved in the process is shown in FIGURE 3; and the steps outlined in the chart are then more specifically explained in outlining the fabrication of an exemplary capacitor.

To construct a plurality of capacitors, such as the capacitors 11, 13, 15 and 17 shown in FIGURE 1, a choice must first be made of the substrate material on which the capacitor materials are to be deposited. In an exemplary arrangement fabricated according to the process described hereinafter, a substrate of glass (commercially available as Corning Microsheet No. 0211) having a thickness of between seven and ten one-thousandths of an inch was chosen.

Before depositing the lower metallic plate 19, a mask was first formed with sufficient size to cover the entire surface of the substrate 18 and thereby control the deposition. Though other masks might prove just as practical, the specific mask was formed from a thin copper sheet which was treated by a photo resist technique to define the openings. The resist-coated sheet was coated with nickel plating to a thickness of approximately 0.002 inch by well known techniques so that all of the sheet was covered except those areas in which the plates 19 of the capacitors 11, 13, 15, and 17 and the leads 27 and 29 were to be deposited. The structure was then etched to remove the copper, and a nickel mask remained. This mask was clamped to the glass substrate 18 to control the metallic deposition process which followed.

After forming the mask, the substrate with the mask affixed was placed in a high vacuum atmosphere of approximately $5 \times 10^{-5}$ millimeters of mercury. Here, aluminum was evaporated off of a tungsten filament at approximately 1000° C. and deposited at the unmasked areas of the upper surface of the substrate 18 to form the desired metallic plates 19 and the conductor 27 connected thereto, though other known deposition processes might have been used. In the specific process, the plates 19 were deposited to a minimum thickness of approximately 2000 angstroms and covered an area of approximately 0.017 square inch, an area calculated to produce the final capacitance desired. The substrate 18 was initially brought to approximately 65° C. for this deposition.

Thereafter, a second nickel mask was formed by the above-outlined process for use in the deposition of the first layer of dielectric material, in the instant case, silicon monoxide.

Silicon monoxide was chosen as an easy-to-deposit insulator having an appropriate dielectric constant. Other insulators with like characteristics would serve as well. For example, a material with a much higher dielectric constant might be used to obtain a higher capacitance. In forming the second mask, the areas of the openings were left slightly larger than were those for the plates 19 so that the deposited dielectric might form an electrical insulator over the edges of the plates 19 to preclude contact with the later-deposited capacitor plates 21.

The silicon monoxide was then deposited by one of the well-known evaporation-deposition processes. In the specific process, the material was evaporated from a crucible constructed of boron nitride (other inert material might be used) at a temperature of approximately 1350° C. The heat was applied by a radiant heater of the molybdenum-tantalum type for approximately twelve minutes; the atmosphere of deposition was a vacuum of approximately $5 \times 10^{-5}$ millimeters of mercury. The substrate temperature was initially brought to 140° C. The silicon monoxide deposited as an amorphous layer having, for the given temperature and times, a thickness of approximately 3500 angstroms. During the deposition, it was noted that if the temperature of the evaporation was raised there was a substantial possibility of causing pinholes in the deposited material. It appears that gaseous pockets within the solid silicon monoxide erupt and eject material into the surface of the depositing material forming the undesirable pinholes.

Thereafter, another mask identical to that used in the deposition of the silicon monoxide was prepared though masks prepared by other processes would obviously suffice. This mask was affixed to the surface of the substrate 18 to define the area of deposition of the low-leakage-characteristic-imparting dielectric material which forms the layer 25. In one exemplary fabrication, a layer of quartz was deposited (aluminum oxide would be deposited in substantially the same manner) by evaporation from a boron nitrate crucible at approximately 2000° C. The evaporation took place in a vacuum of $10^{-4}$ millimeters of mercury with the substrate originally at 140° C. The deposition process continued for about fifteen minutes during which period a layer 25 five hundred angstroms thick was deposited on top of the layer 23 of silicon monoxide material.

Then, utilizing a mask like that prepared for the original deposition of the plate 19, a second aluminum deposition took place. In preparing the mask for the deposition, openings were left so that a terminal 29 would extend from the capacitor 11. In this deposition the upper plate of the capacitor 21 and the conductor 29 were plated to the arrangement. The deposition took place in an atmosphere, at a temperature, and over a period substantially identical to that for depositing the plate 19, though other processes might well be used for forming the aluminum plate. Moreover, though aluminum was the specific material used for the plates, other conductors with like deposition characteristics would serve as well for either of the plates.

A summation of the times required for the individual steps of the above-outlined fabrication clearly demonstrates that low leakage capacitors having the two layer dielectric may be formed in a substantially shorter time than capacitors having a single dielectric of the hard-to-deposit insulating material. For example, capacitors formed by the above-described process required approximately one-half an hour of actual processing whereas capacitors formed with a single layer of low leakage dielectric required approximately two hours to fabricate using the usual process. Furthermore, the time required for the high temperature deposition of quartz in the above outlined process was less than fifteen minutes, approximately one-eighth of the time required to deposit a full layer of quartz material. Since the deposition of the silicon monoxide material takes place at a substantially lower temperature than does the deposition of quartz, it has little effect on the lifetime of the heating equipment used in the evaporation. Thus, the lifetime of the heating equipment is extended to approximately eight times its "single-layer dielectric" lifetime in producing a given number of capacitors. Furthermore, the power consumed in producing the capacitors is substantially reduced with the reductions in temperature and time.

It is also important that the deposition of the hard-to-deposit material over the shorter period required in the present process provides a purer material having a lower leakage characteristic. This result obtains because with a shorter time of deposition the temperature of the substrate remains lower, and fewer impurity elements such as oxygen and nitrogen are given up to contaminate the deposition. The purity of the deposited layers of low leakage material is emphasized by the characteristics of typical capacitors prepared according to the invention. For example, where it had been planned that the capacitors display a leakage of less than one nanoampere with an applied voltage of five volts at a temperature of 125° C. the actual capacitors manufactured according to the invention displayed a leakage of less than one-half of a nanoampere with an applied voltage of five volts at a temperature of 125° C., illustrating the efficacy of the outlined process.

An additional important advantage of the structure which should not be overlooked is its ability to provide small thin film capacitors with substantial values of capacitance. This derives from the fact that materials with quite high dielectric constants are rendered compatible with capacitor leakage requirements by association with the thin low-leakage layer.

I have also determined from my experiments that the use of a two-layer film dielectric allows the tailoring of capacitor characteristics other than the capacitance and the leakage current. For example, by depositing the thin layer of material through the evaporation of aluminum oxide I have been able to realize a capacitor the capacitance of which demonstrates a negative temperature coefficient. By appropriate selection of materials, other capacitor properties may likewise be varied while retaining the desired precision characteristics.

It is therefore clear that remarkable reductions in power requirements, increases in equipment lifetime, and improvements in capacitor leakage characteristics may be obtained by fabricating capacitors with the structure of the present invention. It is, however, to be expressly understood that numerous details of the process of fabrication of the capacitors and of the capacitors themselves may be modified without departing from the basic concepts of the invention. It is therefore to be expressly understood that the invention is to be limited only by the spirit and scope of the appended claims.

What is claimed is:

1. A thin film circuit capacitor comprising a substrate of glass, a first film of aluminum vapor deposited on a surface of said substrate and having a thickness of approximately 2000 angstroms, a second film of silicon monoxide vapor deposited on said first film and having a thickness of approximately 3500 angstroms, a third film of quartz vapor deposited on said second film and having a thickness of approximately 500 angstroms, and a fourth film of vapor deposited aluminum covering said third film and having a thickness of approximately 2000 angstroms.

2. A capacitor deposited on a thin film circuit substrate comprising a pair of substantially parallel metallic plates, and a dielectric interposed between said plates, said dielectric including a first film of vapor deposited material having a selected low evaporation temperature and a selected dielectric constant to impart a predetermined capacitance to the capacitor, and a second film of vapor deposited material having a selected evaporation temperature substantially higher than that of said first film and a leakage characteristic substantially lower than the leakage characteristic of said first film and being approximately one-seventh the thickness of the first film of vapor deposited material.

3. A capacitor consisting of a substrate, a first thin film plate of aluminum positioned on said substrate, a film layer of vapor deposited silicon monoxide dielectric material positioned adjacent and adjoining one lateral surface of said first thin film plate, a film layer of vapor deposited quartz dielectric material having a thickness of approximately one-seventh or less that of said film layer of silicon monoxide dielectric material and having a first lateral surface thereof positioned adjacent and adjoining the lateral surface of said film layer of silicon monoxide dielectric material opposite the surface adjoining said first thin film plate, and a second thin film plate of aluminum positioned adjacent and adjoining a lateral surface of said film layer of quartz opposite said first surface thereof.

4. A low leakage capacitor comprising a structural foundation, a first metallic plate deposited on said foundation, a conductor connected to said first plate, a first layer of dielectric film vapor deposited on said first plate having a selected dielectric constant and a first thickness, a second layer of dielectric film vapor deposited on said first layer, said second layer having a preselected leakage characteristic substantially lower than the leakage characteristic of said first layer and having a thickness of approximately one-seventh said first thickness, a second metallic plate deposited on said second dielectric layer, and a conductor connected to said second metallic plate.

5. A method for fabricating thin film circuit capacitors having a selected low leakage characteristic and a predetermined thickness comprising the steps of depositing a first metallic thin film on a thin glass substrate, vapor depositing a first thin film layer of a first dielectric material having characteristics selected to furnish a predetermined dielectric constant to a selected thickness on said first metallic film, vapor depositing a second thin film layer of a second dielectric material having a leakage characteristic substantially lower than that of said first dielectric material to a thickness of approximately one-seventh or less that of said first layer, and depositing a second metallic thin film to cover said film of second dielectric material.

References Cited by the Examiner

UNITED STATES PATENTS

| | | | |
|---|---|---|---|
| 1,621,068 | 3/1927 | Burger | 317—258 |
| 2,614,524 | 10/1952 | Haynes | 317—258 X |
| 2,759,854 | 8/1956 | Kilby | 317—258 X |
| 2,842,726 | 7/1958 | Robinson | 317—258 |
| 2,866,141 | 12/1958 | Frank | 317—261 X |
| 3,094,650 | 6/1963 | Riegert | 317—258 |
| 3,201,667 | 8/1965 | Varga | 317—258 |

OTHER REFERENCES

Keonjian, E.: "Microelectronics," McGraw-Hill, N.Y., 1963, pp. 191–192.

LEWIS H. MYERS, Primary Examiner.

JOHN F. BURNS, ROBERT K. SCHAEFER, Examiners.

E. GOLDBERG, Assistant Examiner.